Nov. 22, 1932.    H. G. HENARES    1,888,949
BAG MAKING MACHINE
Filed April 24, 1931    8 Sheets-Sheet 1

Inventor
*Hilarion G. Henares,*
By *Jacobi & Jacobi*
Attys.

Nov. 22, 1932.    H. G. HENARES    1,888,949
BAG MAKING MACHINE
Filed April 24, 1931    8 Sheets-Sheet 2

Fig. 3.

Inventor
Hilarion G. Henares,
By Jacobi & Jacobi
Attys.

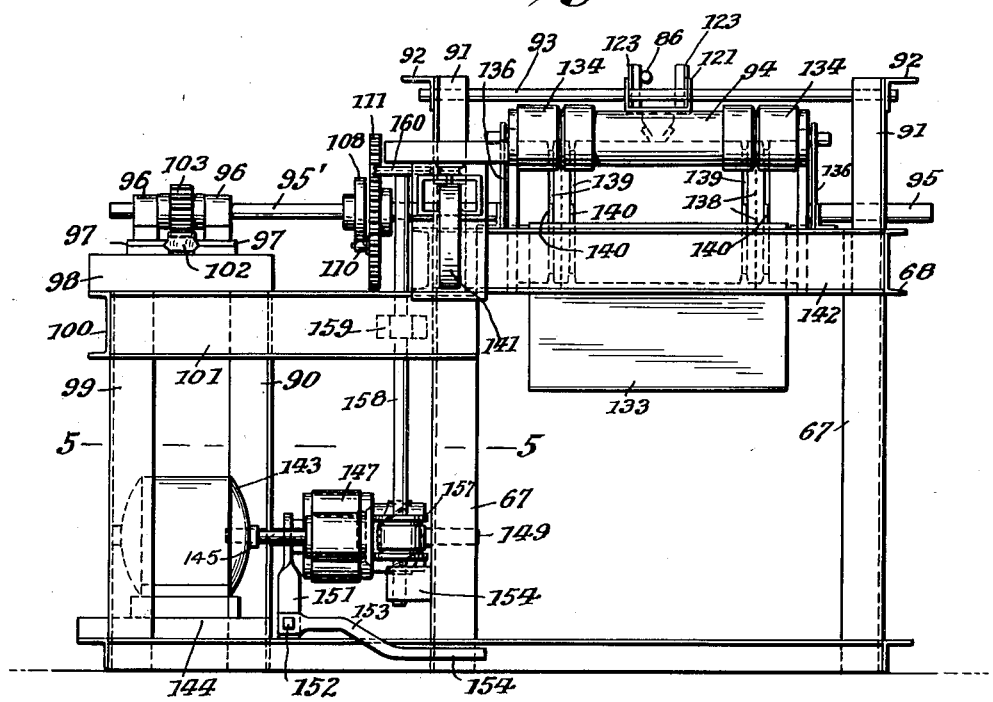

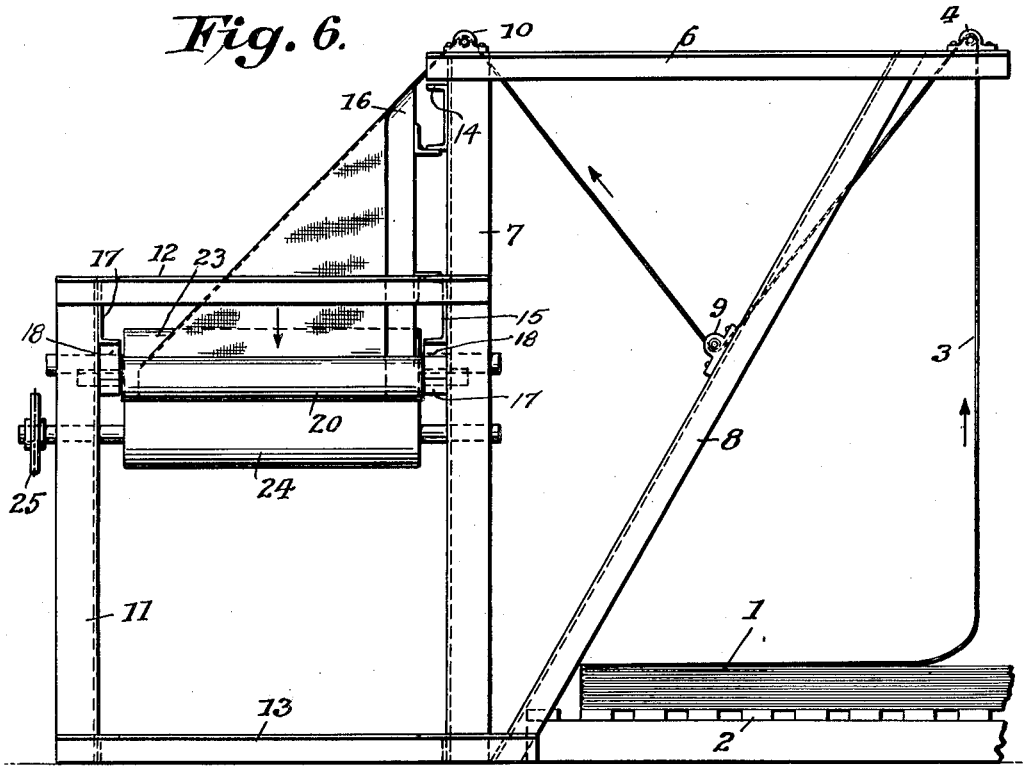
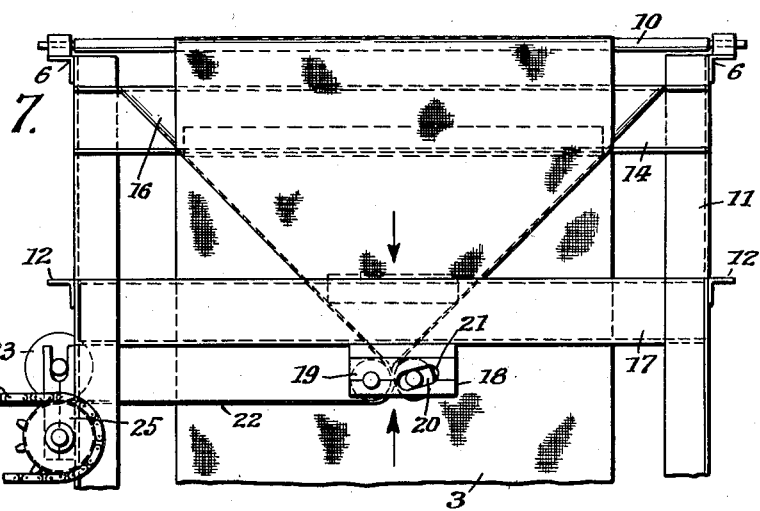
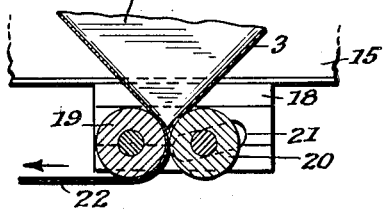

Inventor
Hilarion G. Henares,
By Jacobi & Jacobi
Attys.

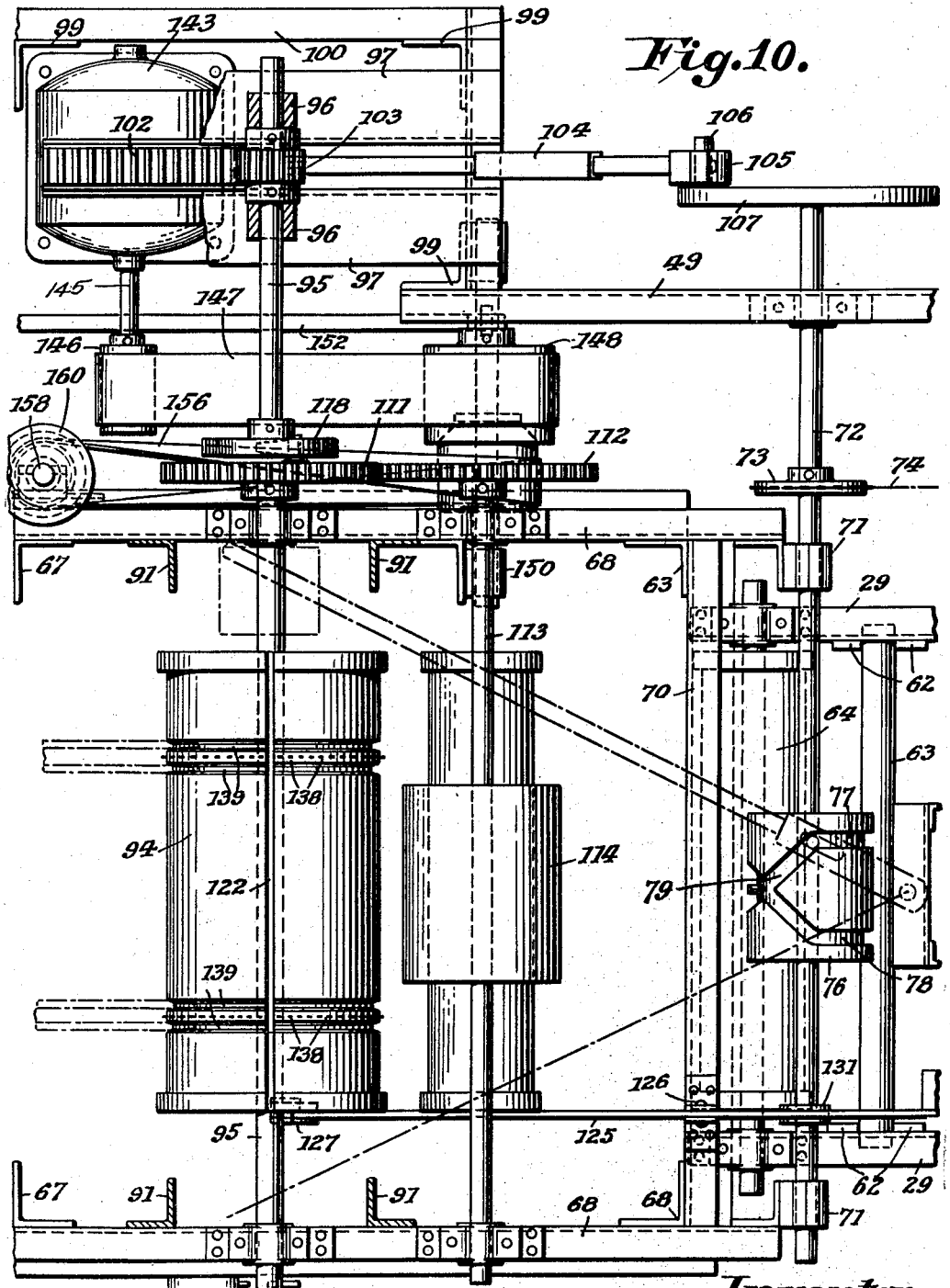

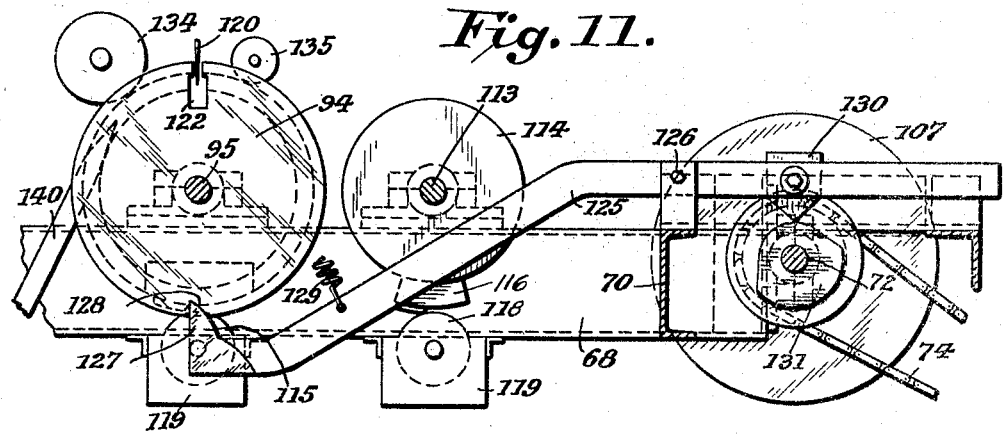
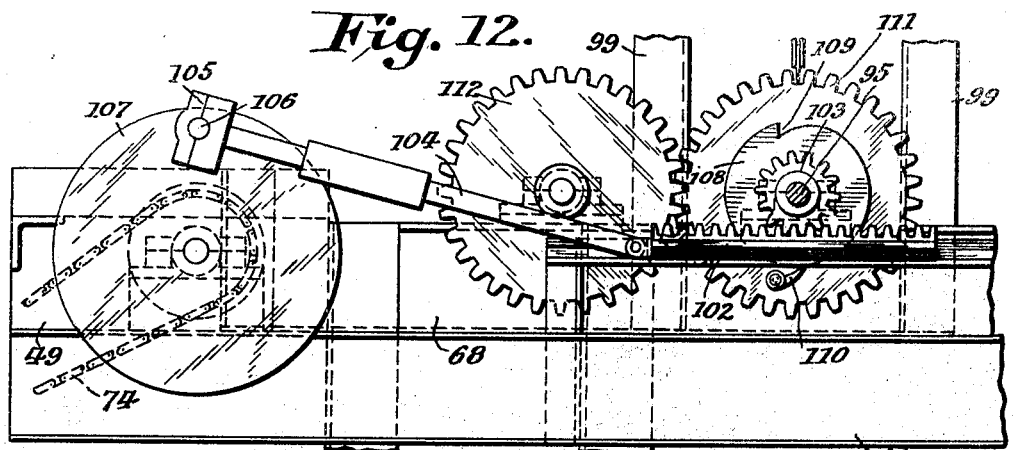
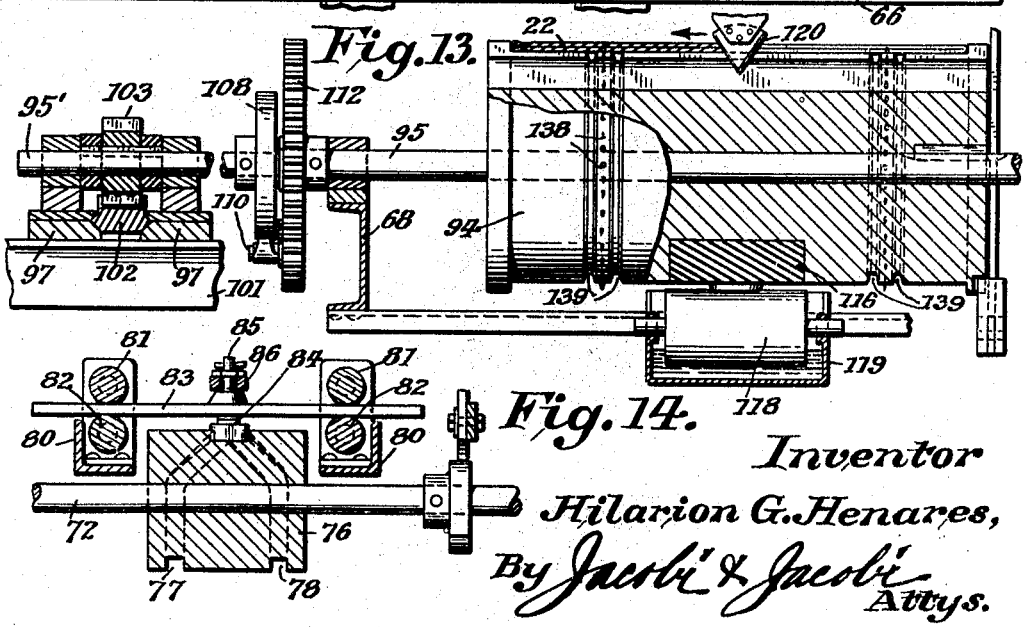

Nov. 22, 1932.  H. G. HENARES  1,888,949
BAG MAKING MACHINE
Filed April 24, 1931    8 Sheets-Sheet 8

Inventor
Hilarion G. Henares,
By Jacobi & Jacobi
Attys.

Patented Nov. 22, 1932

1,888,949

UNITED STATES PATENT OFFICE

HILARION G. HENARES, OF ISABELA, PHILIPPINE ISLANDS

BAG MAKING MACHINE

Application filed April 24, 1931. Serial No. 532,627.

This invention relates to bag making machines and one object of the invention is to provide a machine by use of which bags of the type used in the sugar industry may be very easily and quickly manufactured, it being understood, however, that bags for other purposes may be manufactured by use of the improved bag making machine.

Another object of the invention is to produce a machine by means of which bags may be made from a strip of material which may be of any length desired and as it is passed through the machine will be folded transversely along its longitudinal center and have its meeting side edges sewed together, the folded and sewed strip being then cut transversely to form bags of the proper length and each have one end portion sewed to form a closed bottom.

Another object of the invention is to so construct the machine that when the strip of bag-forming material is folded transversely along its longitudinal center and fed through the bag making machine in its folded condition the fold will be formed exactly along the longitudinal center of the strip and the folded strip held flat and all wrinkles removed, during the sewing and cutting process.

Another object of the invention is to provide a bag making machine of such construction that one operator may control the portion of the machine which forms the sewed and cut blanks for the bag and another operate that portion which sews the blanks across their lower ends to form a closed bottom for each bag.

Another object of the invention is to permit one operator to work independent of the other and thereby make it unnecessary for one operator to discontinue work in case a portion of the machine controlled by the other operator should become temporarily out of order.

Another object of the invention is to so construct this machine that the strip of material will be properly folded and fed through the machine at a proper rate of speed in order to permit the sewing and cutting to be carried out and to further permit a drum over which the free end of the folded and sewed strip passes to be intermittently stopped in its rotation in order that a knife may be moved across the strip and make a straight cut when severing the same.

Another object of the invention is to permit the cutting to take place when the blade is moving transversely of the folded strip in either direction and thereby permit the bag forming blanks to be cut from the folded strip when the blade is moving in either direction.

Another object of the invention is to synchronize movements of the various portions of the machine and thereby cause the various parts to move in proper timed relation to each other.

The invention is illustrated in the accompanying drawings wherein:

Figure 3 is a top plan view of that portion of the machine shown in Figure 2.

Figure 4 is a view in elevation of the discharge end of the machine.

Figure 5 is a fragmentary transverse sectional view taken along the lines 5—5 of Figure 4.

Figure 5a is a fragmentary view in elevation looking from the right of Figure 5.

Figure 6 is an end elevation of the folding mechanism.

Figure 7 is a front elevation of the folding mechanism.

Figure 8 is a fragmentary view of the folding mechanism illustrating the manner in which rollers constituting a portion thereof are mounted.

Figure 10 is a sectional view taken along the lines 10—10 of Figure 9.

Figure 11 is a sectional view taken along the lines 11—11 of Figure 3.

Figure 12 is a section taken along the lines 12—12 of Figure 3.

Figure 13 is a section taken along the lines 13—13 of Figure 9 and illustrating the manner in which the cutting knife moves through the drum when cutting the bags forming blanks from the sewed strip.

Figure 14 is a fragmentary sectional view taken along the lines 14—14 of Figure 3.

Figure 1:
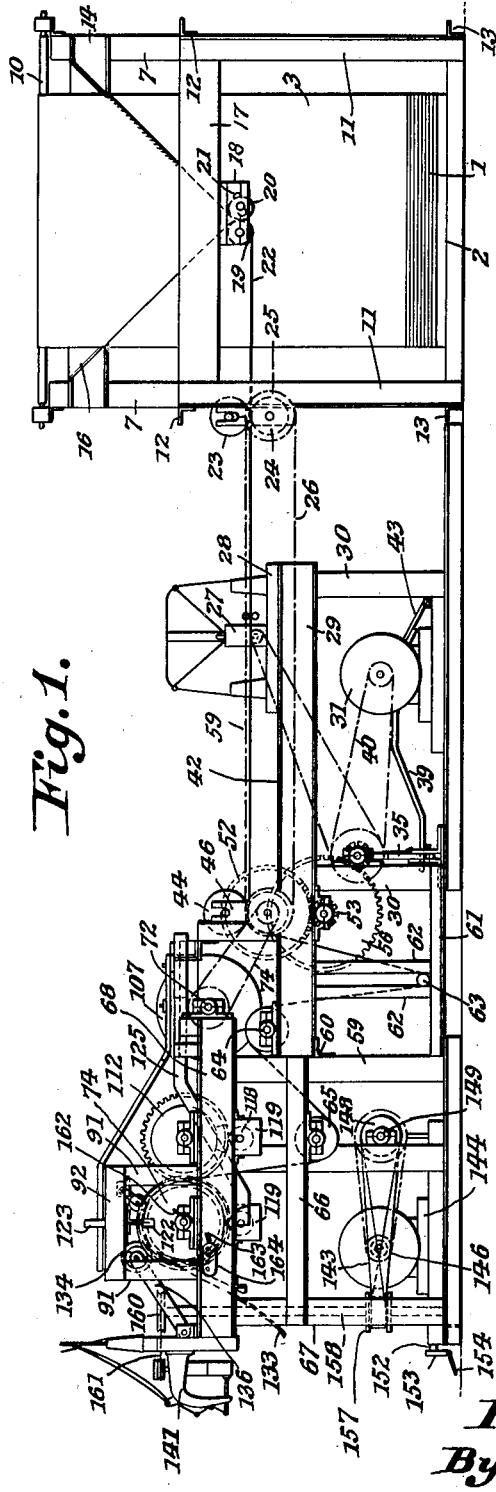
Figure 1 is a view in side elevation looking at the front side of the machine.
Figure 2:
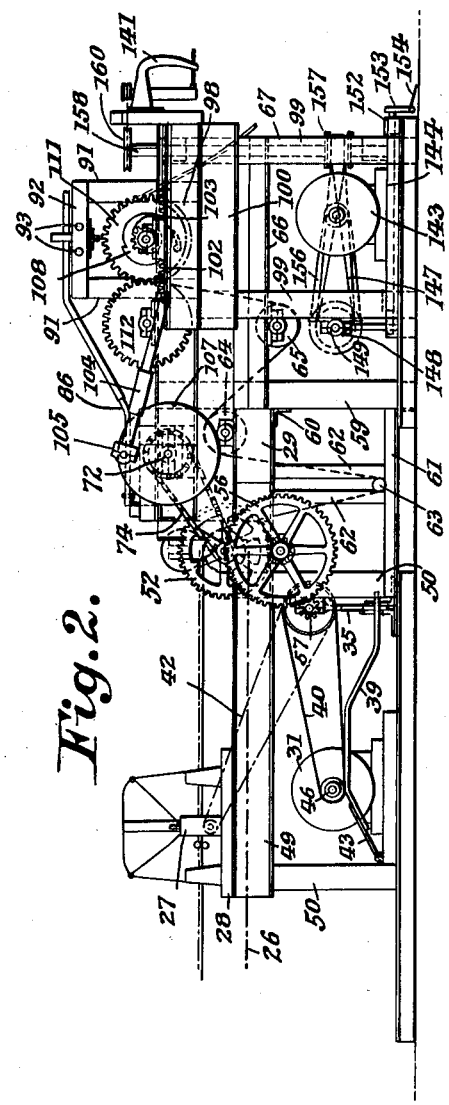
Figure 2 is a view in side elevation looking from the rear with the folding mechanism omitted.

This improved bag-forming machine performs six successive operations during the making of a bag which are; first, a folding operation during which the strip of cloth from which bags are to be formed is folded transversely along its longitudinal center. Second, sewing the meeting edges of the folded strip as this strip moves longitudinally. Third, stamping the name upon both sides of a bag as the strip moves into position for cutting. Fourth, cutting the stamped section from the main folded and sewed strip to form bag blanks which are open at both ends. Fifth, counting the blanks as they are delivered from the cutting mechanism. Sixth, sewing each blank across one end to form a closed bottom for the bags.

The stock of cloth from which the bags are to be formed consists of a long strip of cloth which is preferably hessian cloth but may be any other material suitable for the purpose to which the bags are to be put. This cloth is twice as wide as a sack to be made and instead of being rolled is folded to form a sack 1 which rests upon a platform 2 constituting part of the folded mechanism. After the stack of cloth has been set in place upon the platform the upper end of the cloth is grasped and this cloth which is indicated by the numeral 3 is extended upwardly over a roller 4 rotatably supported in bearings carried by arms 6 which extend rearwardly from uprights or standards 7 and are braced by diagonally extending bracing bars 8. These bracing bars carry bearings in which a roller 9 is supported between them and after the strip of cloth has been engaged with the roller 4 it is extended downwardly at a forward incline and after being engaged with the roller 9 is extended forwardly at an upward incline and over a roller 10 mounted in bearings at the upper ends of the standards 7. Standards 11 which are braced by upper and lower bars 12 and 13 and are shorter than the standards 7 are disposed vertically in front of these standards in spaced relation thereto. Cross bars 14 and 15 which extend between the standards 7 carry a V-shaped folding block 16 which tapers downwardly and forwardly as clearly shown in Figures 6 and 7. A cross bar 17 extends between the standards 11 and this cross bar and the cross bar 15 both carry bearing plates 18 between which extend rollers 19 and 20. It should be noted that the roller 19 has its axle engaged in circular opening formed in the bearing plates whereas the axle of the roller 20 is received in slots 21 extending at an upward incline. Therefore, the roller 20 will have a tendency to move toward the roller 19 and its weight will create sufficient pressure to cause wrinkles to be removed from cloth as it passes between these rollers. By referring to Figures 6 and 7 it will be seen that as the flat strip of cloth moves downwardly along the folding block 16 it will be folded transversely along its longitudinal center and will pass between the rollers 19 and 20 with its side edges in contacting relation to each other. These rollers remove all wrinkles and therefore, the strip emerges from the rollers in the form of a flat sheet 22 of double thickness and half the width of the sheet or strip 3. This is the proper width for the bags to be manufactured and the two layers of the sheet or strips 22 constitute the two walls for the sugar bag.

Rollers 23 and 24 are rotatably mounted in bearings carried by the inner standards 7 and 11, the roller 23 being mounted in vertically extending slots as shown in Figures 1 and 7 so that it accommodates itself to the thickness of the sheet 22 and applies pressure to hold this sheet or strip firmly in engagement with the roller 24 which constitutes a feed roller to draw the strip of cloth through the folding mechanism and has a sprocket wheel 25 fixed upon the outer end of its axle so that rotary motion may be imparted to the roller by means of a sprocket chain 26.

After the strip 3 has been folded to form the strip or sheet 22 of double thickness the contacting free side edges thereof are to be sewed together longitudinally of the strip. In order to do so there has been provided a sewing machine 27 mounted upon a table top or platform 28 over which the folded strip extends. This table top or platform is supported upon a frame having side bars 29 supported by uprights or legs 30 and is to be operated at such speed that the layers of cloth will be properly sewed along their edges as the folded strip is moved across the table A prime mover which is preferably an electric motor 31 is mounted upon a base which may be located beneath the table for convenience or between the table and the folding mechanism if desired. A shaft 32 which is rotatably mounted in bearings carried by the standards or uprights 30 extends transversely beneath this table and carries a pulley 33 which is loose thereon and may be shifted longitudinally of the shaft into and out of engagement with a friction clutch 34 keyed or otherwise firmly fixed to the shaft. A shifting bar or lever 35 which is pivotally mounted at its lower end as shown at 36 has its upper end engaged with the hub of the pulley 33 and is connected with a bell-crank lever 37 by a rod 38 so that when the bell-crank lever is moved by the operator applying pressure to the foot pedal bar 39 the pulley 33 will be shifted along the shaft 32 into gripping engagement with the clutch 34 and rotary motion transmitted to the shaft 32 from the motor through the medium of a belt 40. A grooved pulley 41 is fixed to the shaft 32 and about this pulley is engaged a belt 42 by means of which motion is transmitted to the sewing machine.

It will thus be seen that when the operator places his foot upon the plates 43 and applies pressure to the treadle bar the sewing machine may be placed in operation. By removing pressure from the plate operation of the sewing machine may be stopped.

Figures 15, 16:
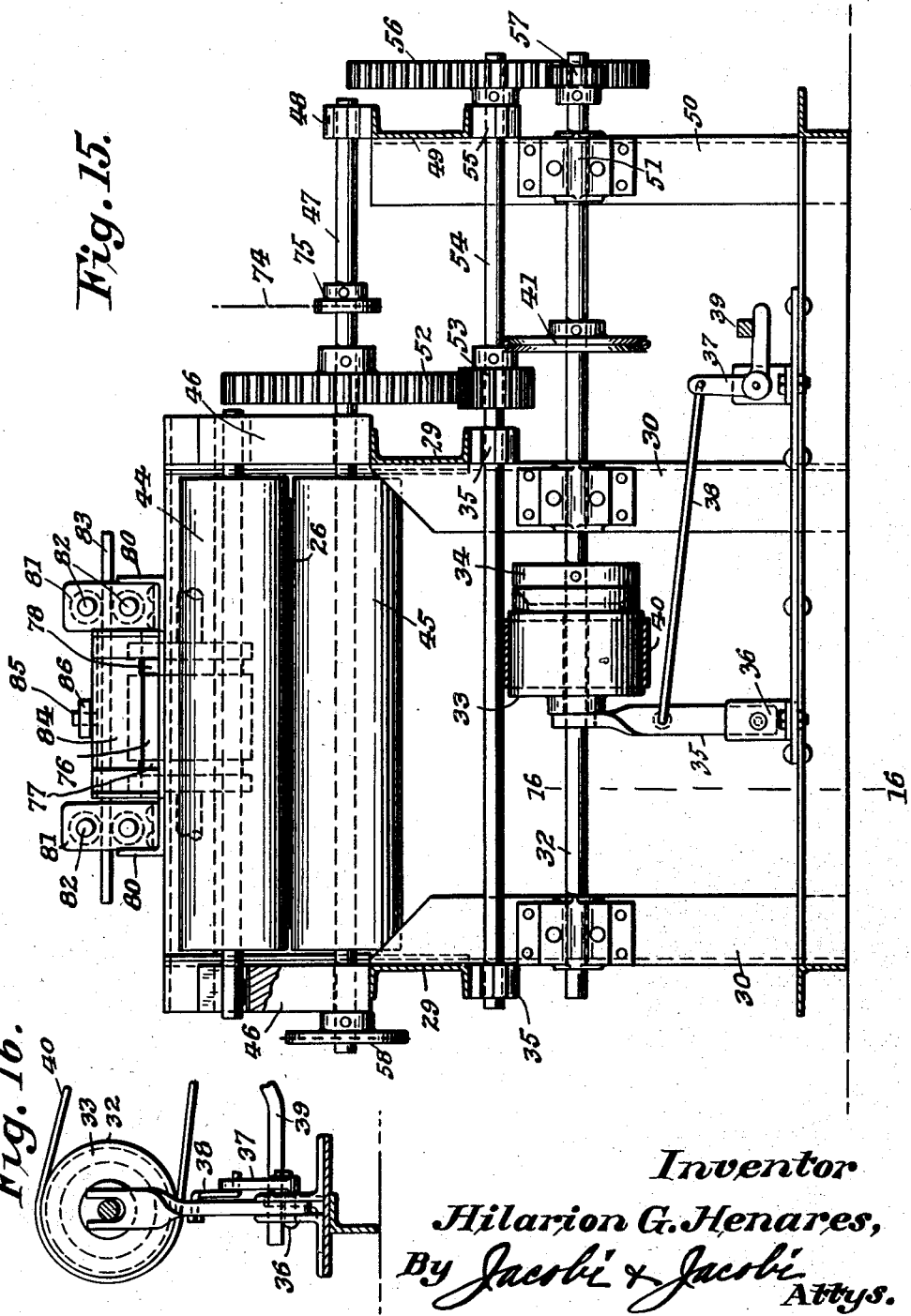
Figure 15 is a sectional view through the machine taken along the lines 15—15 of Figure 3.
Figure 16 is a fragmentary sectional view taken along the lines 16—16 of Figure 15.

The folded strip 26 is to be fed longitudinally across the table during the sewing operation in order to feed the sewed strip to cutting mechanism to be hereinafter described. In order to do so there has been provided rollers 44 and 45 which are mounted in bearings 46 extending upwardly at opposite sides of the table frame and supported by the side bars 29. The roller 44 serves as a pressure roller and therefore has its axle received in vertically extending slots so that it may move vertically and have its full weight brought to bear upon the sewed strip as this strip passes between the rollers 44 and 45. The roller 45 has its axle elongated to form a shaft 47 which projects from the rear side of the table and is rotatably mounted in a bearing 48 carried by a side bar 49 supported by uprights 50. One of these uprights 50 also carries a bearing 51 for the rear end portion of the shaft 32. A large gear 52 fixed upon the shaft 47 meshes with a small gear or pinion 53 fixed upon a counter shaft 54 which is rotatably mounted in bearings 55 and has its rear end projecting beyond the side bar 49 and carrying a large gear 56 meshing with a small gear or pinion carried by the shaft 32. By referring to Figure 15 it will be seen that rotary motion will be transmitted from the shaft 32 to the shaft 54 at a reduced rate of speed and from the shaft 54 to the shaft 47 at a still further reduced rate of speed. Therefore, the strip of folded cloth will be fed across the table and through the sewing machine at the proper rate of speed, it being understood that the speed at which the cloth moves will be such that the sewing machine can properly stitch the free side edges of the folded strips together.

Upon the front end of the shaft 47 is fixed a sprocket wheel 58 about which is engaged the sprocket chain 26 which extends longitudinally of the table and is engaged about the sprocket wheel 25. Therefore, rotary motion will be transmitted from the shaft 47 to the roller 24 and these rollers 24 and 45 will be rotated at the same rate of speed. It will thus be seen that the cloth will be moved at the same rate through the sewing machine as when drawn through the folding apparatus.

The cutting and printing mechanism at the other end of the machine from the folding apparatus has a frame formed of angle bars and including inner standards or uprights 59 carrying a cross bar 60 to which adjoining ends of the side bars 29 are attached. There has also been provided side bars 61 to which are attached the lower ends of vertically extending strips or bars 62 between which are engaged ends of a roller 63 beneath which the strip of sewed fabric is engaged after passing from the rollers 44 and 45. This roller 63 is an idler roller serving as a tightener to apply pressure to the sewed strip and assist in causing it to be properly fed between the rollers 44 and 45. From the roller 63 the sewed strip passes upwardly and over a roller 64 rotatably mounted in bearings near the inner ends of the side beams 29 and then downwardly to engage beneath and about a roller 65 rotatably mounted in bearings carried by side bars 66 having their inner ends secured against the uprights 59 and their outer ends secured to uprights 67. To the upper ends of the uprights are secured side beams 68 united at their ends by cross beams 69 and 70 and to the inner ends of the side beams 68 are secured bearings 71 in which is rotatably mounted a shaft 72 carrying a sprocket wheel 73 about which is engaged a sprocket chain 74 which also engages about a sprocket wheel 75 fixed upon the shaft 47. Therefore, this shaft 72 will be rotated from the shaft 47. A cam cylinder 76 is fixed upon the shaft 72 and about this cylinder is cut a groove or guideway having portions 77 and 78 extending circumferentially about the cylinder parallel to the ends thereof and adjacent thereto and having other portions 79 which are crossed as shown in Figures 3 and 10 and connect ends of the portions 77 and 78 with each other.

By this arrangement a follower moving through the groove as the cam cylinder rotates will first move about the cylinder circumferentially thereof in the portion 77 until it reaches a diagonal portion 79 which it will follow and enter the portion 78 through which it will travel circumferentially of the cylinder near its other end until it again strikes a portion 79 and returns to the portion 77. It will thus be thus seen that with each rotation of the cylinder the follower will move from adjacent one end of the cylinder to the other end and then back again after an interval. Bars 80 extend longitudinally of the machine at opposite sides of the cam cylinder and carry bearings 81 for upper and lower rollers 82 between which is slidably mounted a flat rod or bar 83 having secured thereto a follower 84 to be received in the groove of the cam cylinder. A pin 85 extends upwardly from the follower through a slot formed longitudinally in an arm 86 and this arm has its inner end pivotally mounted as shown at 87 to a support 88 carried by a cross beam 89 supported by uprights 90 and constituting a support for ends of the bars 80. By this arrangement swinging movement will be imparted to the arm 86 as the follower moves through the diagonally extending portions of the cam cylinder in order to operate a cutting blade.

Figure 9:
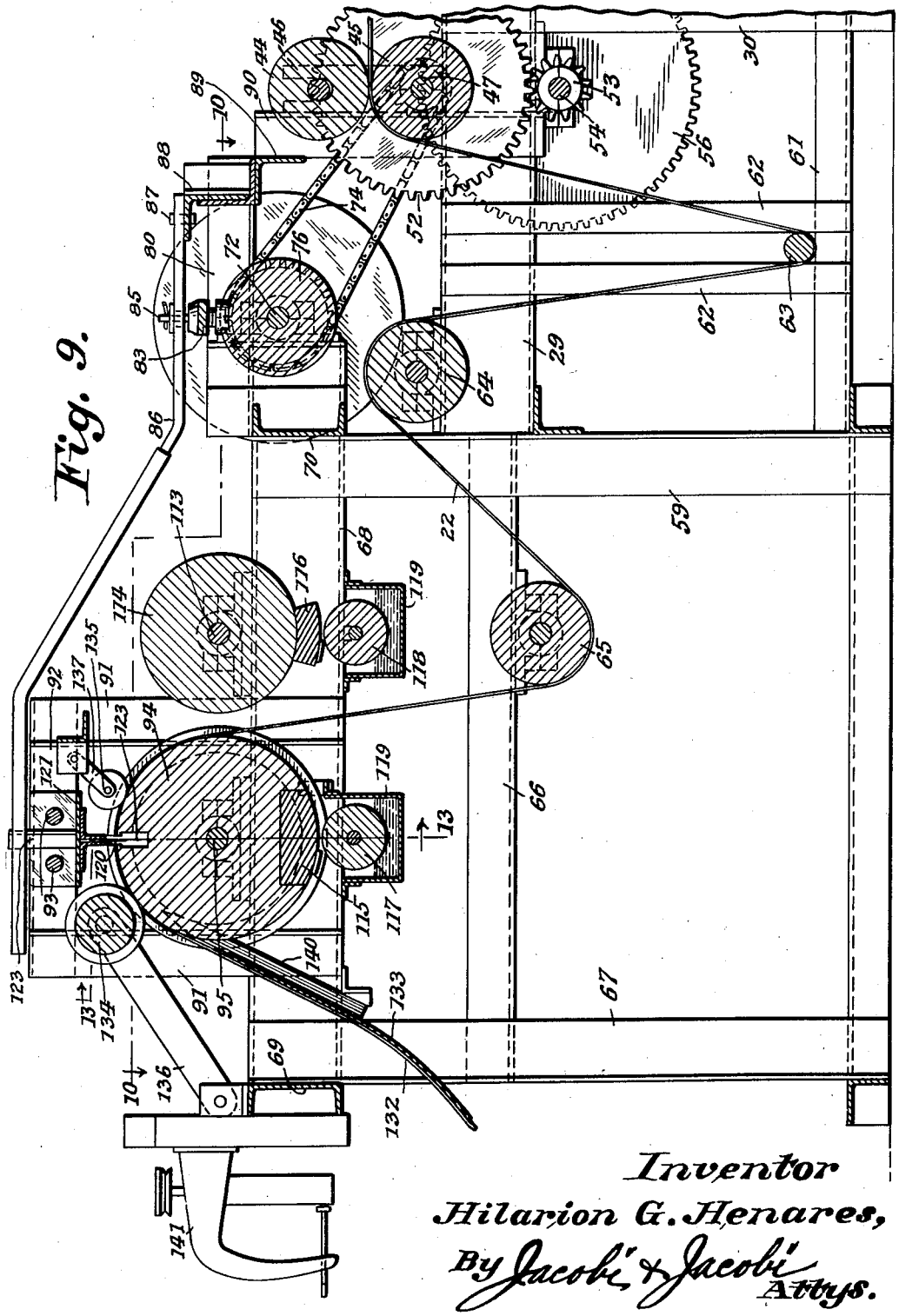
Figure 9 is a longitudinal sectional view taken along the line 9—9 of Figure 3.

A super structure rises from the frame of the cutting apparatus and consists of uprights 91 connected at their upper ends by angle bars 92 serving as supports for rods 93 which extend transversely of the main frame above a cylinder or drum 94 the shaft 95 of which is rotatably mounted in bearings carried by the beam 68 and has a section 95' extended rearwardly of the machine and rotatably mounted in bearings 96 fixed upon supporting bars or beam 97. These flat bars or beams 97 are secured at their ends upon the upper portion 98 of an auxiliary frame having uprights 99, and angle bars 100 and 101, the bars 101 being extended towards the main frame and secured against the adjacent uprights 67. It should be noted that the facing side edges of the bars 97 are grooved as shown in Figures 4 and 13 thereby forming a track for a rack bar 102 the teeth of which mesh with a pinion 103 fixed upon the shaft section 95' between the bearings 96. This rack bar is pivoted at one end to a pitman 104 the outer end of which terminates in a bearing 105 engaged about a pin 106 projecting from a disk 107. The outer portion 95' of the shaft 95 which is mounted in the bearings 96 is formed separate from the portion carrying the drum 94 and at its inner end this shaft section which may be referred to as a rocker shaft carries a disk 108 formed with a spiral edge face interrupted by shoulder 109. A pawl 110 pivoted to a gear 111 carried by the shaft 95 is yieldably held in engagement with the edge face of the disk 108 and it will be readily understood from an inspection of Figure 12 that when the shaft 95 is rotated first in one direction and then in an opposite direction by the action of the rack bar 102 rotary motion will be intermittently imparted to the shaft 95 and drum 94. The gear 111 meshes with a gear 112 carried by a shaft 113 rotatably mounted in bearings fixed upon the side beams 68. It will thus be seen that the drums 94 and 114 will be rotated at the same rate of speed. These drums carry blocks 115 and 116 having provided upon their outer faces a manufacturer's name or trade-mark and below the drums 94 and 114 are located inking rollers 117 and 118 for engagement by the blocks or markers 115 and 116. These rollers are rotatably mounted in operative relation to ink pans 119 and from an inspection of Figure 9 it will be readily seen that as the strip of sewed cloth moves about the drum 94 the outer faces of its two layers will be simultaneously engaged by the markers and the trade mark or the manufacturer's name printed upon the outer faces of the two layers of material and appear upon both sides of a finished bag.

As the strip of folded and sewed cloth moves about the drum 94 it is to be cut into sections of the proper length for forming a sugar bag and in order to do so there has been provided a knife blade depending from a carriage 121 which is slidably mounted upon the rod 93 for movement longitudinally of the drum. The blade is of the proper length to engage in a groove or pocket 123 formed throughout the length of the drum 94. It should be noted that the drum is of such length that when the carriage is at either end of its path of movement the blade will be entirely out of engagement with the drum. Arms 123 project upwardly from the carriage at opposite sides of the arm 86 and it will be readily understood that when the arm 86 is swung longitudinally of the drum by the follower 84 moving through one of the diagonally extended portions 79 of the groove or track formed in the cam block or cylinder 77 the carriage will be moved longitudinally of the drum and the blade will cut through the strip of cloth. When, however, the follower is in one of the circumferentially extending portions 77 or 78 of the groove in the cam cylinder the carriage will be held stationary beyond one end of the drum 94 and the drum may rotate without interference by the blade.

The drum 94 should be held stationary during the cutting operation so that the cut will be formed in a straight line across the cloth and in order to do so there has been provided a bar 125 which is pivotally mounted at 126 and provided at its forward end with a tooth 127 to engage in a notch 128 formed in the head at one end of the drum. This notch is disposed diametrically opposite the slot or groove 122 and therefore when the tooth is engaged in this notch the drum will be held stationary with the slot or groove uppermost and the blade may move freely through the slot. The arm or bar 125 is normally held in position for the tooth to enter the notch by a spring 129 and rearwardly of the pivot point 126 this bar carries an abutment 130 for engagement with a cam 131 carried by the shaft 72. It will thus be seen that as the shaft rotates the cam when in the proper position will serve to rock the rear end of the bar 125 upwardly and move the tooth 127 downwardly out of engagement with the seat or notch formed in the head of the drum and thereby permit the drum to be rotated until the notch again reaches its lowermost position and the spring acts to draw the forward end of the arm upwardly and move the tooth into the notch again. The blank 132 which is cut from the strip of cloth by the knife slides downwardly along a chute 133 and is ready to be sewed at one end. Rollers 134 and 135 carried by pivotally mounted arms 136 and 137 bear against the portion of the strip of folded cloth engaged with the drum and the drum is provided with teeth 138 which bight into the cloth and not only serve to cause the strip of cloth to be carried about the drum as the drum rotates but also serve to prevent the cloth from slipping out of engagement with the drum after a blank has been cut from the cloth. There has also been provided grooves 139 formed circumferentially of the drum and in these grooves are engaged the free ends of plows 140 which serve to free the blanks from the drum as the drum rotates and cause the blanks to pass onto the chute.

After the blanks have been cut from the strip they are to have their lower ends sewed in order to form a closed bottom for each bag. In order to do so there has been provided a sewing machine 141 which is mounted at the outer end of the frame of the cutting mechanism upon a beam 142 extending transversely thereof. A motor 143 is mounted upon a base in the lower portion of the auxiliary frame and the shaft 145 of this motor carries a pulley wheel 146 about which engages the belt 147 which extends inwardly and is engaged about a pulley 148 loosely mounted upon a shaft 149. This shaft which is rotatably mounted in bearings 150 has its hub engaged by a fork formed at the upper end of an arm 151 fixed upon one end of a rocker shaft 152 extending longitudinally of the frame and carrying at its outer end a lever or treadle 153 provided with a foot plate 154. When the operator of the sewing machine 141 places his foot upon the foot plate to swing the lever or treadle 153 downwardly this rotates the shaft 152 and swings the arm 151 in a direction to move the loose pulley 148 towards a pulley 155 fixed upon the shaft 149 and since these pulleys are provided with companion clutch elements as shown clearly in Figure 5 the pulley 155 and the shaft 149 will be caused to rotate. About the pulley 155 is engaged a belt 156 which extends forwardly and is engaged about a pulley 157 carried by a shaft 158 extending vertically. This shaft is rotatably mounted in bearings 159 and at its upper end carries a pulley wheel or disk 160 engaged by a belt 161 serving to transmit motion to the sewing machine 141.

When the bag making machine is in use a stack of cloth is placed upon the platform 2 and one end portion of the cloth drawn upwardly into engagement with the roller 4 and then downwardly to engage roller 9 after which it is carried upwardly over the roller 10 and downwardly in engagement with the folding block 16. This block causes the strip of cloth to be folded along its longitudinal center as it leaves the block and passes between the rollers 19 and 20. The strip of folded cloth extends from the rollers 19 and 20 between the rollers 22 and 24 across the table and the meeting edges of the strip of cloth are sewed together by the sewing machine 27. The strip of sewed cloth then passes between the rollers 44 and 45 which retain the strip at the proper tension and cause it to be fed through the sewing machine at the proper rate of speed. The strip of sewed cloth is then engaged with the tensioning roller 63 and carried upwardly over the roller 64 and then downwardly beneath the roller 65 and upwardly into engagement with the drum 94. As the drum 94 rotates the drum 114 also rotates and the manufacturer's trademark or name will be printed upon both walls of a bag by the blocks 115 and 116. The intermittent rotation of the shaft 95' in one direction by the rack bar causes the drum to intermittently receive rotary motion and as previously explained this drum always comes to a stop with the groove 122 uppermost. At this time the blade travels through the groove and cuts the sewed and printed cloth into blanks all of which are of a length corresponding to the circumference of the drum 94. An arm 162 projecting from one end of the shaft 95 engages the arm 163 of the counter 164 as the drum rotates thereby registering the number of bags which have been cut. The cut blanks are passed through the sewing machine 141 by a separate operator and since this machine is driven by a motor of its own two operators may work independently of each other.

From the foregoing description of the construction of my improved invention the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

What is claimed is:

1. In a bag making machine, means for folding a strip of cloth along its longitudinal center to form a doubled strip having free edges of its layers meeting, means for stitching along the free edges of the strip to form a flat tube having opposed walls, rollers to feed the folded strip through the stitching means, a drum, a marker carried by said drum to imprint identifying marks upon the walls of the folded strip as it passes over said drum, a groove being formed longitudinally in the drum opposite the marker, and means to cut marked sections from the sewed strip as it passes over the drum including a cutter movable longitudinally of the drum and engaged in the groove during such movement.

2. In a bag making machine, means for folding a strip of cloth to form a doubled strip, means for stitching strip to form a flat tube having opposed walls, a drum formed with a longitudinally extending groove, means to feed the folded strip through the stitching means and over the drum, a cutter movable longitudinally of said drum in the groove to cut sewed sections from the strip, means to alternately impart movement to the cutter in opposite directions when the drum is stationary and means to intermittently impart rotary motion to the drum.

3. In a bag making machine, means for folding a strip of cloth along its longitudinal center to form a doubled strip having free edges of its layers meeting, means for stitching along the free edges of the strip to form a flat tube having opposed walls, a drum, means to feed the folded strip through the stitching means and to the drum for passage over the drum, a cutter movable longitudinally of said drum to cut sections from the sewed strip, the drum being formed with a groove to receive the blade of the cutter as it moves along the drum during a cutting operation, and means to hold the drum stationary while the blade is moving along the groove.

4. In a bag making machine, means for folding a strip of cloth along its longitudinal center to form a doubled strip having free edges of its layers meeting, means for stitching along the free edges of the strip to form a flat tube having opposed walls, a drum formed with a longitudinally extending track, means to feed the folded and sewed strip through the stitching means and to the drum for passage over the drum, a cutter movable longitudinally of said drum including a blade to engage in said track and cut sections from the sewed strip as the cutter moves along the drum, means to intermittently impart movement of the drum, and means to secure the drum in a set position when the cutter is moving along the same and cause the cloth to be cut straight across as the cutter moves.

5. In a bag making machine, means for folding a strip of cloth along its longitudinal center to form a doubled strip having free edges of its layers meeting, means for stitching along the free edges of the strip to form a flat tube having opposed walls, a drum, rollers to feed the folded strip through the stitching means and to the drum for passage over the drum, a track extending longitudinally of said drum above the same, the drum being formed with a longitudinally extending recess open at its ends, a carriage slidable along said track, a blade carried by said carriage and engageable in said recess to cut the cloth transversely as the carriage moves, means to intermittently impart rotation to the drum, and means to impart movement to said carriage between rotations of the drum.

6. In a bag making machine, means for folding a strip of cloth along its longitudinal center to form a doubled strip having free edges of its layers meeting, means for stitching along the free edges of the strip to form a flat tube having opposed walls, a drum, means to feed the folded strip through the stitching means and to the drum for passage over the drum, a track extending longitudinally of said drum above the same, a carriage slidable along said track, a blade carried by said carriage to cut the cloth transversely as the carriage moves, means to intermittently impart rotation to the drum, a rotating cylindrical cam element formed with a groove having portions extending circumferentially about the cam element and diagonally extending portions extending in crossed relation to each other and connecting ends of the circumferentially extending portions, a pivotally mounted bar having an end portion extending transversely of the drum and engaging said carriage, and a follower carried by said bar and engaged in said groove to swing the bar longitudinally of the drum when moving through the diagonal portions of the groove and slide the carriage longitudinally of the track and cause the blade to cut transversely through the cloth.

7. In a bag making machine, means for folding a strip of cloth along its longitudinal center to form a doubled strip having free edges of its layers meeting, means for stitching along the free edges of the strip to form a flat tube having opposed walls, a drum, means to feed the folded strip through the stitching means and to the drum for passage over the drum, a track extending longitudinally of said drum above the same, a carriage slidable along said track, a blade carried by said carriage to cut the cloth transversely as the carriage moves, a bar pivotally mounted and having an end portion engaging said carriage, means to intermittently impart rotary motion to said drum, and means to intermittently impart swinging movement to said bar and slide the carriage along the track to cut the cloth transversely between rotations of the drum.

8. In a bag making machine, means for folding a strip of cloth along its longitudinal center to form a doubled strip having free edges of its layers meeting, means for stitching along the free edges of the strip to form a flat tube having opposed walls, a drum, means to feed the folded strip through the stitching means and to the drum for passage over the drum, a track extending longitudinally of said drum above the same, a carriage slidable along said track, a blade carried by said carriage to cut the cloth transversely as the carriage moves, a bar pivotally mounted and having an end portion engaging said carriage, means to intermittently impart rotary motion to said drum and impart swinging movement to the bar to move the carriage along said track and cut a section from the cloth while the drum is stationary, and means to releasably secure the drum in a set position during a cutting operation.

9. In a bag making machine, means for folding a strip of cloth along its longitudinal center to form a doubled strip having free edges of its layers meeting, means for stitching along the free edges of the strip to form a flat tube having opposed walls, a drum, means to feed the folded strip through the stitching means and to the drum for passage over the drum, a track extending longitudinally of said drum above the same, a carriage slidable along said track, a blade carried by said carriage to cut the cloth transversely as the carriage moves, a bar pivotally mounted and having an end portion engaging said carriage, a rotating shaft, means to intermittently transmit rotary motion to said drum from said shaft, a latch pivotally mounted and engaging said drum to releasably secure the drum in a set position between rotations thereof, a cam carried by said shaft and engaging said latch to move the latch out of securing engagement with the drum, a cylindrical block carried by said shaft and formed with a groove having portions extending circumferentially of the block and other portions extending diagonally thereof, and a follower carried by said bar and engaged in said groove to swing the bar when moving through the diagonal portions of the groove and slide the carriage longitudinally of the track and cause the blade to cut transversely through the cloth.

10. In a bag making machine, means for folding a strip of cloth along its longitudinal center to form a double strip having free edges of its layers meeting, means for stitching along the free edges of the strip to form a flat tube having opposed walls, a drum, means to feed the folded strip through the stitching means and to the drum for passage over the drum, a track extending longitudinally of said drum above the same, a carriage slidable along said track, a blade carried by said carriage to cut the cloth transversely as the carriage moves, a bar pivotally mounted and having an end portion engaging said carriage, a rotating shaft, a rocker shaft, a pinion carried by the rocker shaft, a rack engaging said pinion, a pitman connected with the rack and rotating shaft, means to transmit rotary motion from said rocker shaft to said drum when the rocker shaft is rotating in one direction, means carried by the rotating shaft to impart swinging movement to said bar and slide the carriage along its track to cut a section from the cloth, and means actuated from the rotary shaft to releasably secure the drum in a set position when the latter is stationary.

11. In a bag making machine, means for folding a strip of cloth along its longitudinal center to form a doubled strip having free edges of its layers meeting, means for stitching along the free edges of the strip to form a flat tube having opposed walls, a drum, means to feed the folded strip through the stitching means and to the drum for passage over the drum, a track extending longitudinally of said drum above the same, a carriage slidable along said track, a blade carried by said carriage to cut the cloth transversely as the carriage moves, means to intermittently impart rotation to the drum, means to press portions of the cloth against the drum in front of and back of the blade and hold the cloth in engagement with the drum, means to impart movement to the carriage while the drum is stationary, and means to detach the cut section of cloth from the drum during rotation of the drum.

In testimony whereof I affix my signature.

HILARION G. HENARES.